United States Patent [19]

Beebe

[11] Patent Number: 5,237,505

[45] Date of Patent: Aug. 17, 1993

[54] METHOD AND APPARATUS UTILIZING STATIC IMBALANCE TO REDUCE VIBRATION CAUSED BY TIRE/WHEEL ASSEMBLIES AND TIRE/WHEEL ASSEMBLY MADE USING SAME

[75] Inventor: James C. Beebe, Kent, Ohio

[73] Assignee: Illinois Toll Works Inc., Glenview, Ill.

[21] Appl. No.: 695,572

[22] Filed: May 3, 1991

[51] Int. Cl.$^5$ .............................................. G01M 1/38
[52] U.S. Cl. ...................................... 364/463; 73/459; 73/462; 301/5.22
[58] Field of Search ....................... 364/463, 506, 508; 73/8, 66, 146, 457–462, 468–471, 650; 301/5.21, 5.22

[56] References Cited

U.S. PATENT DOCUMENTS

| | | | |
|---|---|---|---|
| 3,412,615 | 11/1968 | Nedley | 73/146 |
| 4,016,020 | 4/1977 | Ongaro | 301/5.22 X |
| 4,098,127 | 7/1978 | Shiga et al. | 364/463 X |
| 4,366,707 | 1/1983 | Jarschel | 73/146 |
| 4,489,606 | 12/1984 | Shiohata et al. | 364/463 X |
| 4,626,147 | 12/1986 | Nystuen et al. | 364/508 X |
| 4,815,004 | 3/1989 | Beebe | 364/506 |
| 4,817,429 | 4/1989 | Goebel | 73/459 |
| 4,891,981 | 1/1990 | Schonfeld | 73/460 |
| 5,060,510 | 10/1991 | Rousseau | 73/146 |
| 5,171,067 | 12/1992 | Kawabe et al. | 301/5.22 |

OTHER PUBLICATIONS

"Uniformity of Tire–Wheel Assemblies," D. J. Schuring, Tire Science & Technology, TSTCA, vol. 19, No. 4, Oct.–Dec. 191, pp. 213–236.

Primary Examiner—Thomas G. Black
Assistant Examiner—Thomas S. Auchterlonie
Attorney, Agent, or Firm—Ruden, Barnett, McClosky, Smith, Schuster & Russell

[57] ABSTRACT

The mass of a tire/wheel assembly is altered to apply a static imbalance to the assembly in a manner which reduces the overall tendency of the assembly to cause vibration in the plane perpendicular to its axis of rotation when in use. The applied imbalance, combined with any static imbalance initially inherent in the tire/wheel assembly, results in a desired net static imbalance oriented so as to induce a centrifugal force which opposes, and therefore tends to cancel, at least one component, such as the first order harmonic, of radial force variation characterizing the assembly. The magnitude of the net static imbalance is limited and is preferably selected to substantially equal the lesser of either: (a) a predetermined maximum limit, or (b) the amount of static imbalance required to generate at a designated highway speed a centrifugal force whose magnitude substantially equals that of the aforementioned radial force variation component.

36 Claims, 4 Drawing Sheets

METHOD AND APPARATUS UTILIZING STATIC IMBALANCE TO REDUCE VIBRATION CAUSED BY TIRE/WHEEL ASSEMBLIES AND TIRE/WHEEL ASSEMBLY MADE USING SAME

FIELD OF THE INVENTION

This invention relates to reducing vehicle vibration caused by tire/wheel assemblies. More particularly, this invention relates to an apparatus and method for producing a limited amount of net static imbalance in a tire/wheel assembly so as to reduce the tendency of the assembly to cause vibration in the plane perpendicular to its axis of rotation when in use. A further aspect of the invention relates to a tire/wheel assembly so produced.

BACKGROUND OF THE INVENTION

Tire/wheel assemblies can produce annoying vibration in the vehicles on which they are used. Complaints concerning such vibration are a costly source of warranty claims made against vehicle manufacturers. Vibration caused by tire/wheel assemblies tends to be most objectionable at "highway" speeds, that is, speeds in the general range of speed limits and customary vehicle speeds on major highways. A number of reasons have been postulated as contributing to this phenomenon.

First, at speeds lower than highway speeds, tire/wheel induced vehicle vibration tends to be masked by vibrations induced by secondary roadways which are often rougher than highways. Also, at these lower speeds, the vehicle occupants tend to be preoccupied with other sensory inputs, such as linear and angular vehicle acceleration and deceleration.

Another possible reason relates to the structural dynamics of automobiles. Automobiles can exhibit a secondary resonance in the vertical direction in the range of frequencies excited by once per revolution inputs of tires rotating at highway speeds. This secondary resonance and accompanying vertical vibration mode are attributable to the unsprung mass of the vehicle (tires, wheels, and the unsprung portion of the suspension and drive train) acting upon the "spring" represented by the radial spring rate of the tires. Human sensitivity to vibration also appears to be acute in this same frequency range.

Two significant sources of tire/wheel assembly induced vibration in the plane perpendicular to the axis of rotation of the assembly are static imbalance and radial force variation. Sources of induced vibration induced by tire/wheel assemblies can be broadly classified into two categories; those which vary as a function of the rotational speed of the assembly and those which are substantially independent of speed. Static imbalance induces vibration in both the vertical (i.e. radial) and horizontal (i.e. fore/aft) directions in a manner which increases dramatically with speed. In contrast, radial force variation acts only in the vertical direction and has been observed to be substantially independent of speed. Vertical vibration, whether due to static imbalance, radial force variation or a combination of the two, tends to be sensed by the occupants of a vehicle primarily through the vehicle body. On the other hand, the horizontal vibration caused by static imbalance tends to be transmitted through the steering mechanism and sensed by the driver of a vehicle at the steering wheel.

Because of these significant differences in behavior, conventional practice in mitigating vibration has most commonly been to address static imbalance and radial force variation as being separate and distinct from one another. Being substantially independent of speed, radial force variation has been addressed other than by altering static imbalance which produces forces which change with speed. Likewise, tire/wheel assemblies have been traditionally balanced so as to exhibit substantially zero net static imbalance irrespective of their force variation characteristics. Before describing these conventional practices, it is appropriate to consider the nature of static imbalance and radial force variation as well as the manner in which they are measured.

Static imbalance in a tire/wheel assembly results from an uneven distribution of mass around its axis of rotation and can be defined as a vector directed from the axis of rotation toward the center of gravity of the assembly. The magnitude of that vector is given by the product of the mass of the tire/wheel assembly and the distance by which its center of gravity is offset from its axis of rotation. When the assembly rotates, static imbalance produces a centrifugal imbalance force of a magnitude equal to the product of the imbalance and the square of the angular velocity at which the assembly rotates. It is for that reason that the magnitude of vibration caused by a given amount of imbalance varies as a function of speed. Due to the continuously acting, rotational nature of centrifugal force, static imbalance tends to induce vibration in the fore/aft direction as well as in the vertical direction. Because the magnitude of this centrifugal force varies according to the square of the angular speed of the tire/wheel assembly, the vibration transmitted through the vehicle body as well as that sensed at the steering wheel becomes more noisome as vehicle speed increases.

Static imbalance of tire/wheel assemblies can be measured on any of a number of types of available equipment including the familiar static or dynamic balance machines, such as those commonly used in automotive shops. In a typical static balance machine, a tire/wheel assembly is mounted upon a pivotable spindle. Gravity causes the center of gravity of the assembly to align vertically with the pivot point. A bubble indicator responsive to the direction and degree of pivoting of the spindle is then read to determine the static imbalance. The tire/wheel assembly is not rotated during this procedure.

A typical dynamic balance machine operates by mounting a tire/wheel assembly on a spindle and then rotating the assembly about the spindle axis. Since the assembly will attempt to rotate about its center of gravity irrespective of the original position of the spindle, static imbalance can be determined by resolving the forces tending to move the spindle as the tire/wheel assembly rotates. Some dynamic balance machines are capable of simultaneously measuring static imbalance and another type of imbalance known as "dynamic imbalance" or "couple" which indicates the tendency of a tire/wheel assembly to tilt from side to side as it rotates. Couple is undesirable since it represents a source of vibration which is independent of static imbalance.

Prior art attempts to reduce, vibration generated by static imbalance have typically sought to produce a tire/wheel assembly whose static imbalance was as close to zero as practicable so that the assembly would generate substantially zero imbalance force when rotating. This was done by first measuring the imbalance initially present and then attempting to cancel that measured imbalance by adding to the assembly an equal and opposite compensating imbalance. Such compensating imbalance was applied by mounting one or more weights to the assembly at a location 180° opposite from its center of gravity in the rotational plane so as to oppose the measured imbalance. In order to null static imbalance, the weight was typically mounted on the wheel and was selected such that its mass multiplied by the radial distance between the weight and the axis of rotation would generate a countering static imbalance equal and opposite to the measured static imbalance. Thus, in the prior art, both the mass of the applied weight and its mounting orientation were typically selected without regard to force variation.

A similar approach has been taken to reduce vibration generated by dynamic imbalance. The dynamic imbalance initially present in a tire/wheel assembly is measured (usually while simultaneously measuring static imbalance) and then nulled by applying weights or otherwise altering the mass of the assembly. In order to correct for dynamic imbalance it is generally necessary to alter the mass of a tire in each of two planes, one of which is located on the "inner" or "vehicle" side of the assembly and the other of which is located on the "outer" or "curb" side of the assembly. These inner and outer planes are each perpendicular to the intended axis of rotation and are mutually spaced apart from one another.

Rather than adding separate sets of weights to null static and dynamic imbalance separately, modern balance machines are capable of measuring both quantities at once and specifying the mass and location of a weight to be added to each respective inner and outer plane in order to null static and dynamic imbalance in a single operation. One such machine which has a high throughput capacity and is intended for use in a tire/wheel production process is the Model ATW-231 available from ITW Micropoise of Indianapolis, Indiana. This machine includes an adjacent weighting station which includes a display for indicating to an operator the weight (or mass) and angle of counterbalance weight to be applied to each respective inner and outer plane at a predetermined correction radius so as to substantially null both static and dynamic imbalance in a single operation.

Radial force variation in a tire/wheel assembly is distinct from imbalance and can be generated by either the tire, the wheel or both. When a tire rotates along a surface under a radial load such as that due to the weight of a vehicle, structural nonuniformities in the tire give rise to self-excited fluctuations in the reaction forces exerted between the tire and the surface along various directions. The fluctuations of these forces in the vertical direction represent radial force variations generated by the tire.

Radial force variation, as well as other parameters indicative of tire nonuniformity, is measured using a uniformity machine. In a typical uniformity machine, an inflated tire is rotatably driven with its tread surface in forced contact with the circumferential surface of a loadwheel. The loadwheel rotates on a spindle which, coupled to a force transducer, measures forces acting on the load-wheel in directions of interest, including the radial direction. A rotary encoder tracks the rotation of the tire by generating a series of equiangularly spaced pulses as the tire rotates. Those pulses, together with signals indicative of the instantaneous forces registered by the force transducer are communicated to a computer associated with the machine. In response to the pulses, the computer samples and stores a series of measurements of the force-indicating signals over a complete revolution of the tire. The computer then carries out a Fourier analysis to determine at least one nonuniformity-indicating parameter based on one or more selected harmonics of the force-indicating signal. Each harmonic is conventionally represented in vector form as a magnitude and an angle, the latter of which corresponds to a particular angular location on the tire. Acceptable tires are usually marked on their sidewall to indicate the angular location at which a selected harmonic of radial force variation, typically the first order harmonic, reaches its peak value. The tire is graded by comparing the measured value of one or more nonuniformity indicating parameters to previously determined specification criteria. Such criteria are usually specified as numerical limits indicating that the tire should either be rejected, accepted or subjected to corrective measures in attempt to bring its performance within acceptable limits.

It is known for example to correct for excessive radial force variation by removing material from selected portions of the tire tread. This is commonly carried out by providing a tire uniformity machine with one or more selectively actuatable grinders operating as disclosed for example in Rogers et al. U.S. Pat. No. 4,458,451 which is expressly incorporated herein by reference in its entirety. While often beneficial, such techniques do not guarantee acceptably low levels of radial force variation in tire/wheel assemblies. One reason for this is that, as noted previously, tires are not the only potential contributors to radial force variation in tire/wheel assemblies. As the assembly rotates, dimensional nonuniformities in the wheel can also induce radial force variation.

Dimensional nonuniformities in wheels such as radial runout at the bead seat of a wheel, can cause radial force variation in a tire/wheel assembly by interacting with the radial spring rate of the tire. For example, assume that a given wheel has an average radial runout of x (inches) at a particular angular location on its beadseat and further assume that a tire having an effective radial spring rate of k (pounds per inch) is mounted upon that wheel. Such runout can be expected to contribute a radial force of k times x (pounds) when that angular location aligns with the vertical axis. In a tire/wheel assembly, any radial force variation contributed by dimensional nonuniformities in the wheel combine with that contributed by the tire to produce a resultant radial force variation which indicates the tendency of the tire/wheel assembly as a whole to vibrate radially. That resultant radial force variation (or harmonics thereof) can be estimated by measuring the radial force variation (or harmonics thereof) generated by the tire and vectorially adding thereto the expected radial force variation expected to be contributed by the wheel based on a separate measurement of the average radial runout of the wheel (or corresponding harmonics thereof).

Vehicle wheels are inspected for dimensional nonuniformity using wheel uniformity analyzers such as the Model SST-WUA wheel uniformity analyzer manufactured by Akron Standard, an ITW Company, located in Akron, Ohio. Such equipment can be used to identify a specific location on the circumference of the wheel, such as the circumferential location 180° opposite the location corresponding to the angle of the first harmonic of the average radial runout of the beadseat of the wheel.

It has been known to attempt to minimize vertical vibration of tire/wheel assemblies by orienting the tire with respect to the wheel such that the vector describing the first harmonic of the radial force variation of the tire is opposed by the vector describing the first harmonic of the average radial runout of the wheel. When the tire and wheel making up an assembly are so oriented, the first harmonic of radial force variation of the tire tends to be at least partially cancelled by the force component induced by the first harmonic of the radial runout of the wheel and vice versa. This reduces the tendency of the tire/wheel assembly to vibrate in the vertical direction.

A novel method for pairing tires from a given population of tires with wheels from a given population of wheels so as to optimally reduce radial force variation in the resulting population of tire/wheel assemblies is disclosed in copending, commonly assigned U.S. patent application Ser. No. 07/556,951 entitled "Process and Apparatus for Pairing Tires and Wheels" which is expressly incorporated herein by reference in its entirety. However, even such orientation and pairing do not guarantee exact cancellation; some residual radial force variation can be expected to remain in tire/wheel assemblies made from tires and wheels so oriented and paired.

SUMMARY OF THE INVENTION

While beneficial, the techniques described above do not usually entirely eliminate radial force variation or static imbalance and do not provide adequate assurance that a tire/wheel assembly will not generate, especially at highway speeds, objectionable vibration due to radial force variation either alone or combined with the influence of static imbalance. It has been observed that when tires, which have been measured for radial force variation, are mounted upon wheels, which have been measured for average radial runout in a mutual orientation which is expected to reduce the radial force variation generated by the tire/wheel assembly as a whole, actual radial force variation measurements made of the assembly as a whole do not agree precisely with values expected based on the separate inspections of the tire and wheel. Such disparity varies in both magnitude and direction and can cause a tire/wheel assembly which is expected to yield a satisfactorily low level of vibration to exhibit an unacceptable level of vibration when in use.

The invention further recognizes that in many cases, vibration caused by residual radial force variation tends to be exacerbated by the influence of static imbalance and vice versa thereby producing a vibration level greater than either of these sources would cause by itself, especially at highway speeds.

In view of the foregoing, it is an objective of the invention to provide an economically mass producible tire/wheel assembly which does not generate objectionable vibration due to static imbalance and/or radial force variation when in use.

It is a further objective of the present invention to reduce, especially at highway speeds, vehicle vibration caused by vibration of a tire/wheel assembly in the plane perpendicular to its axis of rotation.

It is another objective of the present invention to reduce vibration due to residual radial force variation as well as static imbalance in a single operation by altering the mass of a tire/wheel assembly.

A further objective of the invention is to accomplish the foregoing reduction in vibration without requiring further mass altering steps to be carried out in order to reduce vibration caused by dynamic imbalance.

The invention fulfills the above objectives by providing a novel and effective apparatus and method for reducing vibration in a tire/wheel assembly as well as a tire/wheel assembly made using same. This is achieved by applying a limited amount of static imbalance to a tire/wheel assembly in a manner which reduces the overall tendency of the assembly to cause vibration in the plane perpendicular to its axis of rotation when in use. The applied limited static imbalance, combined with any static imbalance initially inherent in the tire/wheel assembly, results in a desired net static imbalance oriented so as to induce a force which opposes, and therefore tends to cancel, the first harmonic of radial force variation of the assembly. In so doing, the invention directly contravenes the conventional teaching of the prior art that tire/wheel assemblies should be balanced to exhibit a static imbalance as close to zero as practicable.

Further diverging from the prior art in a nonobvious manner, the invention contemplates determining the magnitude and direction of the static imbalance applied to the assembly to produce such desired limited net static imbalance, based not only upon the initial static imbalance measured in the assembly, but also based upon the radial force variation exhibited by it. The magnitude of the limited net static imbalance is selected to be substantially equal to the lesser of either: (a) a predetermined maximum limit or (b) the amount of static imbalance required to generate at a designated highway speed a centrifugal force whose magnitude substantially equals that of the first harmonic of radial force variation. The maximum limit is specified as a value capable of giving rise to only imperceptible or at least unobjectionable levels of vibration over a wide range of speeds including speeds in excess of the aforementioned designated highway speed.

It is to be noted that the invention does not presume to render existing techniques for reducing nonuniformity in tires and wheels unnecessary. Rather, it strives for a greater degree of reduction in vibration than those techniques alone can afford. Excessive nonuniformity in tires and/or wheels can cause severe vibration at all speeds whereas the improvement afforded by the invention varies with speed. To effectively cancel severe vibration at highway speed by producing a net static imbalance in the assembly, such net static imbalance would have to exceed the maximum net static imbalance limit recognized by the present invention. Doing so would be likely to cause objectionable steering wheel vibration and/or objectionable vertical vibration at speeds in excess of normal highway speeds in the event the vehicle is operated at those excessive speeds.

In a first preferred embodiment, a tire/wheel assembly is measured both on a uniformity machine, to determine a vector V1 representing the first harmonic of radial force variation and on a balance machine to determine a vector V2 representing the static imbalance initially inherent in the assembly. Both vectors are then communicated to a computer which uses vector V1 to determine a vector V3 whose direction is the same as that of vector V1. In order to limit the amount of net static imbalance intended to remain in the assembly to a value incapable of giving rise to objectionable levels of vibration, the computer selects the magnitude of vector V3 as being equal to the lesser of either the aforementioned maximum limit or a value representing the magnitude of imbalance required to generate a force equal to that of vector V1 when the assembly rotates at a desired highway speed. Vector V3 is then added to vector V2 to produce a resultant vector V4. The complement of vector V4 defines a vector V5 which represents the magnitude and direction of additional imbalance to be applied to the assembly. The mass of the assembly is then altered such as by applying at least one weight to the assembly so as to produce the imbalance represented by vector V5. Vector V5 is of a magnitude and direction such that when it is added to the measured imbalance represented by vector V2, a vector V6 representing a desired limited net static imbalance equal and opposite to vector V3 is produced. To avoid adding undesired dynamic imbalance, half of the required additional weight is preferably applied to each half plane at the same angular location on the assembly.

In a second preferred embodiment, a tire/wheel assembly is measured on both a balancer and a uniformity machine as described above. However, two separate mass altering operations are used to achieve the desired limited net static imbalance. After the initial static imbalance inherent in the assembly is measured, the assembly is balanced conventionally, such as by applying one or more weights, so as to momentarily achieve a substantially zero net static imbalance and preferably, a substantially zero dynamic imbalance as well. The magnitude and angle of the first harmonic of radial force variation as measured by the uniformity machine is then used to calculate a vector V7 representing the static imbalance which would be required to generate the measured first harmonic of radial force variation when the assembly rotates at a designated highway speed. The magnitude of vector V7 is then compared to the maximum limit referred to earlier. A desired limited net static imbalance is then defined as a vector V8 oriented in the opposite direction thereto and whose magnitude equals the lesser of the compared values. The mass of the assembly is then altered, such as by attaching additional weight thereto, so as to create that desired limited net static imbalance. Again, one half of the required weight is preferably applied to each half plane to avoiding adding dynamic imbalance to any which may already be present in the assembly.

A third preferred embodiment permits dynamic imbalance to be nulled and a desired limited net static imbalance to be generated by altering the mass of a tire/wheel assembly only once in both an inner and outer plane. Upon measuring the assembly, the balance machine, operating in the manner typical of the prior art, specifies for each respective plane, the weight (mass) and angular location of a weight which, if applied to the assembly at a specified correction radius would substantially null both static and dynamic imbalance. After determining a desired limited net static imbalance in the manner described earlier and converting same to a weight (mass) acting at a specified correction radius, and a particular angle, one half of such weight (mass) at such particular angle is vectorially added to the weight (mass) and angle specified by the balancer for each respective inner and outer plane. One equivalent weight representing each respective vector sum is then applied to the inner and outer planes of the tire/wheel assembly, respectively.

When the tire/wheel assembly rotates in use, the desired limited net static imbalance produced according to any of the above embodiments generates a force of speed-dependent magnitude which opposes and tends to cancel the radial force variation component represented by vector V1. As a consequence, vehicle vibration in both the vertical and fore/aft directions is reduced over a wide range of speeds.

Another important advantage of the invention is that the degree of cancellation increases with speed until a designated highway speed is reached. At that speed or some greater speed, nearly perfect cancellation is achieved so that vibration is reduced to a minimum.

Yet another advantage of the present invention is that vibration induced by radial force variation and static imbalance are both reduced merely by altering the mass of the assembly.

Another advantage of the invention is that the required alteration in the mass of the assembly can be carried out in a single mass altering operation and can also be effected so as to simultaneously null any dynamic imbalance present in the assembly.

Another advantage of the invention is that it can be assembled and carried out using readily available components.

These and other aspects and advantages of the invention will become apparent to those of ordinary skill in the art upon review of this document including the claims, the detailed description and the accompanying drawings wherein like reference numerals indicate like items.

BRIEF DESCRIPTION OF THE DRAWINGS

FIG. 5A and 5B are vector diagrams which together illustrate the third preferred embodiment of the invention in further detail and wherein FIG. 5A illustrates the operations carried out with respect to an outer plane of a tire/wheel assembly and FIG. 5B illustrates the operations carried out with respect to an inner plane thereof.

DETAILED DESCRIPTION

Figure 1:
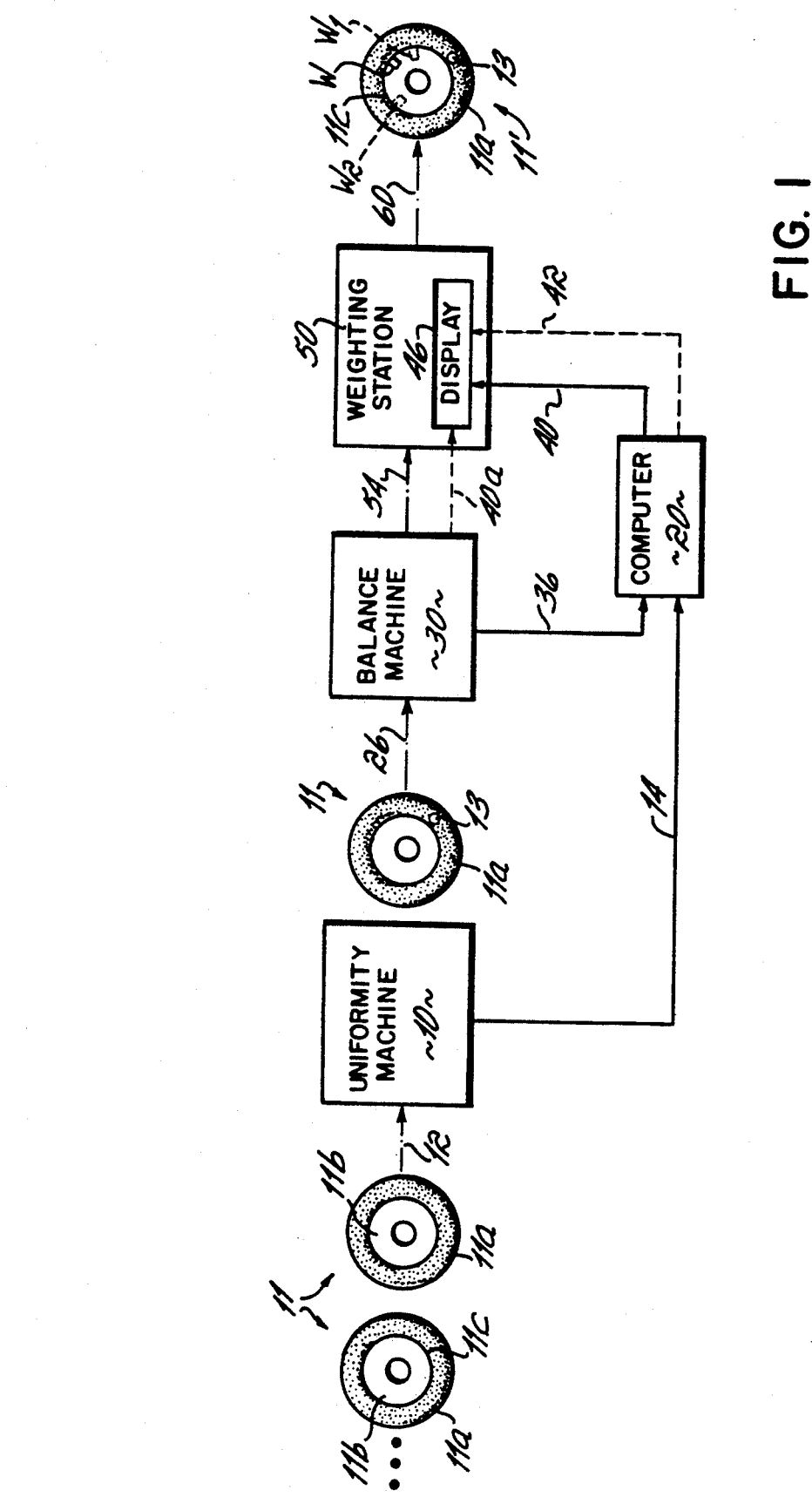
FIG. 1 is a schematic block diagram illustrating first and second preferred embodiments of the present invention.

With reference now to FIG. 1, there is illustrated a first preferred embodiment as well as a second preferred embodiment of the apparatus of the invention. Both embodiments include a uniformity machine 10 to which a plurality of tire/wheel assemblies 11 are conveyed one at a time by a conveyor 12. Tire/wheel assemblies 11 each include a tire 11a which has been mounted on a wheel 11b and inflated to a proper pressure. Each wheel 11b includes a pair of peripheral flanges 11c lying on opposite sides of tire/wheel assembly 11. Flanges 11c, only one of which can be seen on each assembly 11 shown in FIG. 1, define imaginary parallel inner and outer planes and are capable of supporting weights which can be applied thereto for the purpose of altering the static and/or dynamic imbalance of assembly 11. Preferably, tires 11a and wheels 11b have been previously processed, paired and oriented as disclosed in the aforementioned U.S. patent application Ser. No. 07/556,951 entitled "Process and Apparatus for Pairing Tires and Wheels" which has been expressly incorporated herein by reference in its entirety.

Uniformity machine 10 may suitably comprise a conventional tire uniformity inspection machine, such as a Model 70 TUG manufactured by Akron Standard, an ITW Company of Akron, Ohio, equipped with a chuck suitable for supporting a tire/wheel assembly 11 under test. Upon testing each tire/wheel assembly 11, uniformity machine 10 generates a vector signal 14 which is received by a computer 20. Signal 14 represents a vector V1 which represents a parameter indicative of the radial force variation generated by the tire/wheel assembly 11 tested on machine 10. Preferably, V1 represents the magnitude and angle of at least one component of the radial force variation characterizing assembly 11 as measured by machine 10 and most preferably represents the magnitude and angle of the first order harmonic of such radial force variation. Machine 10 is equipped with a marking system which applies a visible mark 13 to the sidewall of each tire 11a at an angular location corresponding to the angle of the first order harmonic of radial force variation of the tire/wheel assembly 11 in order to provide an angle reference useful in subsequent operations.

The arrangement described thus far is one in which tires already mounted upon wheels are tested as an assembly by uniformity machine 10 in order to generate signal 14. As an alternative thereto in either this or any of the other embodiment described herein, the arrangements shown in either FIGS. 2 or 4 of the previously incorporated U.S. patent application Ser. No. 07/556,951 could be substituted for uniformity machine 10 with only minor modification thereto. That modification would merely entail programming the computer 28 of the aforementioned application to generate signal 14 of the present application by vectorially adding the signals 42 and 30 of that application which correspond to each tire and wheel paired according to the invention of that application. The signal 14 so generated by said computer 28 could then be transmitted to computer 20. More preferably, the computer 28 of the aforementioned application would be eliminated and its functions consolidated with those of the computer 20 hereof.

The alternatives just described are less expensive to implement initially since the machine 10 for testing tires and wheels in the form of completed tire/wheel assemblies 11 is not required. However, they can also generally be expected to be somewhat less effective in reducing vibration. Unlike the signal 14 generated by machine 10 in response to measuring a tire/wheel assembly 11, the signal 14 generated by computer 28 based on separate inspections of tires and wheels as individual components is merely a predictor of the actual behavior of a tire/wheel assembly 11 to be formed by mounting those components in an assumed mutual orientation. Errors may therefore arise from imprecision in the computational model employed by computer 28 as well as from any failure to mutually orient the tire and wheel precisely as intended in the process of mounting.

After a tire/wheel assembly 11 is measured on uniformity machine 10 or processed according to one of the alternatives just described so as to generate signal 14, it is transported by way of a conveyor 26 to a conventional balance machine 30. Machine 30 may suitably comprise a commercially available balance machine capable of determining the magnitude and angle of the imbalance initially inherent in each tire/wheel assembly 11 and is preferably the aforementioned ITW Micropoise Model ATW-231 or equivalent.

In the first preferred embodiment, balance machine 30 generates and transmits to computer 20 a signal 36 which represents a vector V2 which represents the magnitude and direction of the static imbalance initially present in the tire/wheel assembly 11 most recently received from uniformity machine 10. Operating in a manner to be described in further detail hereinafter with reference to FIG. 2, computer 20 uses vector signals 14 and 36 to generate a vector signal 40 which represents the magnitude and angle of additional static imbalance to be applied to a particular tire/wheel assembly 11. That additional static imbalance is of a magnitude and angle such that when it is added to the initial static imbalance represented by signal 36, a desired limited net static imbalance is produced in the tire/wheel assembly 11 under consideration. As will be described in further detail below, such desired limited net static imbalance reduces the tendency of tire/wheel assembly 11 to cause objectionable vibration in the plane perpendicular to its axis of rotation when it is used. Signal 40 is then communicated to a display 46 located at a weighting station 50. Weighting station 50 may either form a part of balance machine 30 or comprise a remote station which receives tire/wheel assemblies from balance machine 30 by way of a conveyor 54 as illustrated in FIG. 1.

At weighting station 50, an operator selects one or more weights which total the amount of weight (or equivalently, mass) indicated on display 46 and applies them to at least one flange 11c of tire/wheel assembly 11 such that its/their center of gravity (in a plane perpendicular to the intended axis of rotation of tire/wheel assembly 11) acts at the angular location indicated on display 46. One half of the amount of weight (mass) indicated by display 46 is preferably mounted on the inner plane of assembly 11 and the remaining half is mounted on its outer plane to avoid adding undesired dynamic imbalance to assembly 11. After one or more weights is applied at weighting station 50 to achieve the desired limited net static imbalance, an output conveyor 60 transports each completed tire/wheel assembly 11' away from weighting station 50 either for use or for such further processing unrelated to the present invention as may otherwise be desired.

Figure 2:
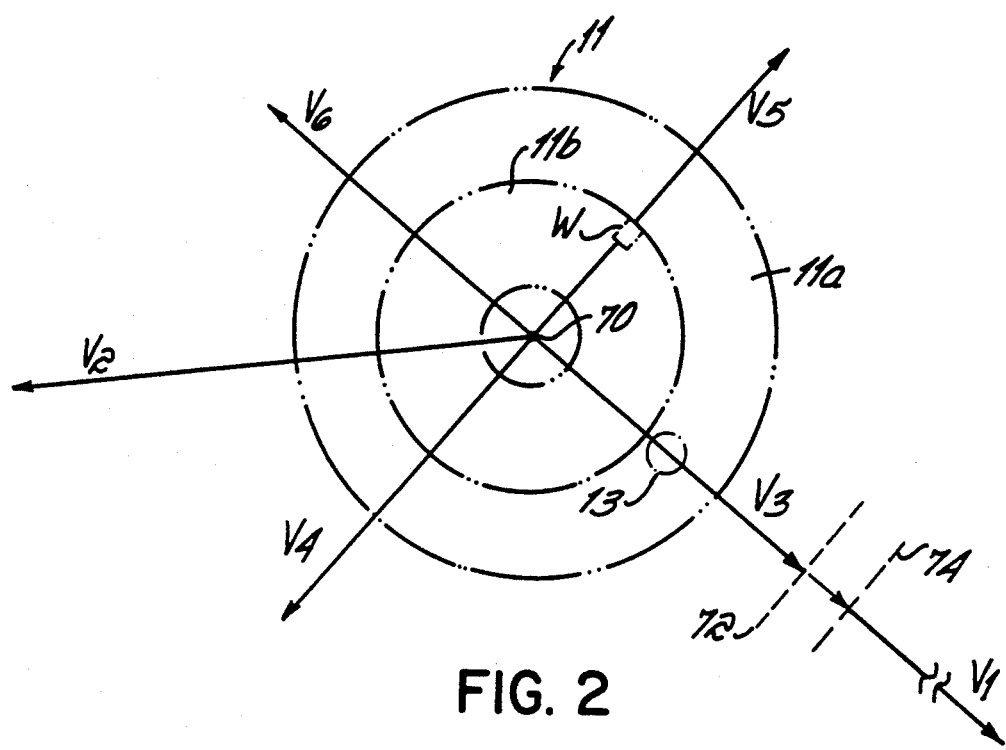
FIG. 2 is a vector diagram illustrating the first preferred embodiment of the invention in further detail.

Referring now to FIG. 2, the operations carried out by computer 20 according to the first preferred embodiment of the invention will now be described in further detail. Computer 20 receives signal 14 and stores a representation thereof as vector V1 which, as previously noted, preferably represents the magnitude and angle of the first order harmonic of radial force variation of assembly 11 as measured by uniformity machine 10. The magnitude of vector V1 is expressed in units of force and, as also noted earlier, its angle preferably corresponds to the location of the mark 13 which uniformity machine 10 applies to each tire/wheel assembly 11. Mark 13 thus provides a convenient angle reference from which the information presented on display 46 can be interpreted in order to apply one or more weights, W, to tire/wheel assembly 11 at an angular location specified with respect to mark 13. As is the case for all of the vectors depicted in FIGS. 2, 3, 5A and 5B, the aforementioned vector, V1, originates from a point 70 lying on the intended axis of rotation of tire/wheel assembly 11 and extends along a plane perpendicular to that axis.

Computer 20 also receives signal 36 and stores in its memory a representation thereof as vector V2. Vector V2 represents the magnitude and angle of the static imbalance initially present in the same tire/wheel assembly 11. Because vector V1 is expressed in units of force and vector V2 is typically expressed in units of imbalance (or equivalently, weight (mass) at a specified radius), it is necessary to represent both vectors using a similar set of units before proceeding further. In the preferred embodiment, computer 20 does so by calculating the magnitude of "equivalent" static imbalance or weight (mass) at a specified radius which, assuming no other static imbalance is present in tire/wheel assembly 11, would have to be present at the angular location of vector V1 in order to generate a force having the magnitude of vector V1 when tire/wheel assembly 11 rotates at a designated highway speed. That magnitude, which is indicated at 74 in FIG. 2, is then stored by computer 20. In accordance with the invention, the designated speed just referred to is preferably selected as the speed at which maximum cancellation of vector V1 and thus maximum reduction in vibration is desired. The designated speed is selected as a speed in the range of typical highway speeds expected to be encountered when tire/wheel assembly 11 is in actual use. In the United States, such speeds are currently in the range of 50 to about 70 miles per hour and the preferred designated speed for tire/wheel assemblies to be used in the United States is about 60 miles per hour. For tire/wheel assemblies to be used in countries such as Germany, where it is both legal and customary to drive at considerably higher speeds on highways, a correspondingly higher designated speed would preferably be selected.

Computer 20 then compares magnitude 74 with a stored, predetermined magnitude limit 72 in order to define a vector V3 whose magnitude is limited and is preferably selected as being equal to the lesser of either predetermined maximum limit 72 or the actual magnitude 74 of the aforementioned "equivalent" static imbalance at the designated speed.

Limit 72 is selected such that the total imbalance residing in any completed tire/wheel assembly 11' after carrying out the present invention will be less than an amount capable of giving rise to an unacceptable frequency of vibration complaints. Limit 72 is best determined after evaluating the process capability of the balance measuring and weight applying operations and determining an expected or maximum total static imbalance error associated therewith. Limit 72 is then preferably specified as an imbalance value which, when added to such error, would result a static imbalance which, if present alone in a tire/wheel assembly 11, could generate, at most, a level of steering wheel vibration imperceptible or at least unobjectionable to a targeted class of persons. A maximum limit 72 capable of giving rise to no more than about four pounds of centrifugal force at speeds as least as great as the designated highway speed is currently regarded as best.

After vector V3 is determined, computer 20 adds vectors V2 and V3 in order to determine the magnitude and direction of a resultant vector V4. Computer 20 then defines a vector V5 as being a vector of the same magnitude but opposite direction as vector V4. As such, vector V5 represents an additional static imbalance which must be added to tire/wheel assembly 11 such that when combined with the initial static imbalance represented by vector V2, a desired limited net static imbalance which is represented in FIG. 2 as a vector V6 will be produced in tire/wheel assembly 11. Vector V6 is equal in magnitude to but opposite in direction from vector V3 and also represents the vector sum of vectors V5 and V2. Thus, once the additional static imbalance represented by vector V5 is applied to a tire/wheel assembly 11, that assembly will exhibit the desired limited net static imbalance represented by vector V6.

To facilitate the application of the imbalance represented by vector V5 to the tire/wheel assembly 11 under consideration, information correlated to the magnitude and angle of vector V5 are communicated to display 46 via signal 40 and displayed thereon in any suitable format.

Preferably, the angle of vector V5 is represented as a number of degrees, radians or other units either clockwise or counterclockwise of mark 13. Thus, one or more weights, W, can be applied to assembly 11 with its/their overall center of gravity (as measured in the plane of FIG. 2) acting in the direction of vector V5.

Although the magnitude of vector V5 could suitably be displayed in units of imbalance, computer 20 preferably causes such magnitude information to be displayed in a manner which does not require further mental conversion or interpolation on the part of human operator at station 50 and thereby facilitates maximum productivity. It is preferred therefore that such magnitude appear on display 50 in units of weight (mass) to be applied at a correction radius which preferably corresponds to the radius of flange 11c. Computer 20 rounds such weight (mass) to the nearest value represented by one of a plurality of discrete sizes of weights available at station 50 or simply displays a code designating a particular bin or bins in which weights of the appropriate size are stored for use. A human operator at weighting station 50 then selects the proper weight or weights and attaches it to the flange 11c of assembly 11 at an angle relative to mark 13 in accordance with the angle information appearing on display 46. To avoid adding undesired dynamic imbalance, one half the mass of weight W is preferably applied to the inner side of flange 11c and the remaining half to the outer side thereof. As those skilled in the art will appreciate, a robot responsive to signal 40 could alternatively be used to apply weights at station 50 in lieu of using a human operator and display 46.

In operation of the first embodiment of the invention, tire/wheel assemblies 11 are conveyed to machine 10 which generates and transmits to computer 20 a vector signal 14 representing the magnitude and angle of the first harmonic of radial force variation of the assembly and applies a mark 13 thereto at such angle. Thereafter, the assembly is conveyed to balance machine 30 which generates and transmits to computer 20 a signal 36 representing the static imbalance initially present in the assembly 11. Thereafter, the assembly is transported to a weighting station 50 which includes a humanly-readable display 46. Operating in the manner described above with reference to FIG. 2, computer 20 processes signals 14 and 36 to generate a vector signal 40 whose magnitude and angle are displayed in a desired format on display 46. In accordance with that magnitude and angle information, a human operator at weighting station 50 alters the mass of tire/wheel assembly 11 by applying one or more weights thereto so as to produce a desired limited net static imbalance in the completed tire/wheel assembly 11'.

Referring once again to FIG. 1, a second preferred embodiment of the invention will now be described.

This second preferred embodiment uses a two-step procedure for altering the mass of a tire/wheel assembly 11 in order to produce a desired limited net static imbalance therein. In one step, a tire/wheel assembly 11 is first balanced conventionally by adding one or more compensating weights, W1, such that a substantially zero net static imbalance is momentarily achieved. Thereafter, one or more additional weights, W2, is added in accordance with information correlated to the radial force variation by the assembly so as to generate a desired limited net static imbalance of the nature previously described.

The structure and operation of the second preferred embodiment are similar to those of the first preferred embodiment described above except for the differences now to be described. First, signals 36 and 40 are not generated or used. Rather, balance machine 30 operates in a conventional manner generating at least one vector signal 40a correlated to the magnitude and angle of the compensating imbalance or weight (mass) required to be applied to tire/wheel assembly 11 so as to produce therein a substantially zero net static imbalance. That information is communicated directly to display 46 and displayed thereon in any of the formats described earlier. In response to the displayed information, one or more first weights, W1, is applied by an operator at station 50 to each tire/wheel assembly 11 so as to momentarily produce a substantially zero net static imbalance therein. In lieu of signal 40, computer 20 generates for displaying in any of the formats discussed earlier a vector signal 40b which represents the magnitude and angle of the additional imbalance or weight (mass) which must then be applied to the tire/wheel assembly 11 under consideration in order to produce therein the desired limited net static imbalance. In response to the displayed information, one or more corresponding additional weights, W2, is then applied at station 50.

Figure 3:
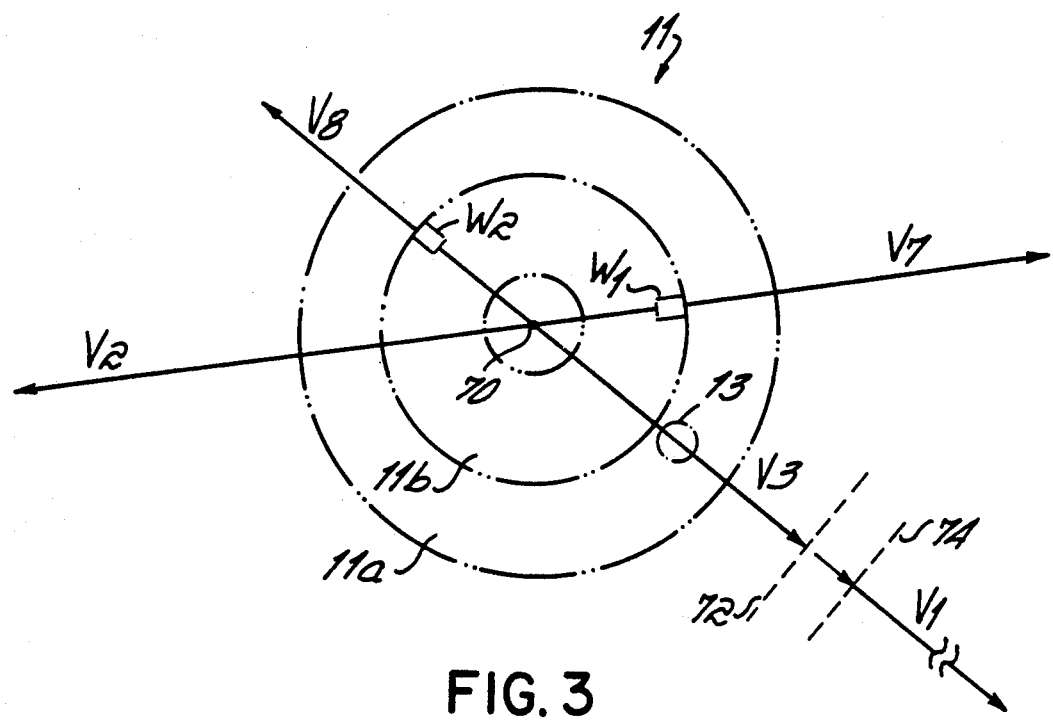
FIG. 3 is a vector diagram illustrating the second preferred embodiment of the invention in further detail.

FIG. 3 is a vector diagram which illustrates the second preferred embodiment of the invention in further detail. According to this embodiment, computer 20 determines vectors V1, V2 and V3, referred to above, in the same manner as previously described with reference to FIG. 2. In FIG. 3, signal 40a is represented by a vector V7 correlated to a static imbalance equal and opposite the measured static imbalance initially present in tire/wheel assembly 11 as indicated by vector V2. Vector V7 is displayed as a magnitude and angle on display 46 in any of the formats described earlier. In accordance with that magnitude and angle information, an operator at weighting station 50 then applies one or more weights, W1, to tire/wheel assembly 11 in order to equally and oppositely counterbalance vector V2, thus, momentarily producing a substantially zero net static imbalance in tire/wheel assembly To avoid adding undesired dynamic imbalance, one half of the mass of weight, W1, is preferably added to each opposing side of the flange 11c of assembly 11.

The desired limited net static imbalance to be applied to assembly 11 after it has been balanced in the manner just described is represented by signal 40b. Signal 40b is represented in FIG. 3 as a vector V8 which is equal in magnitude to, but opposite in direction from vector V3, and thus represents a desired limited net static imbalance to be applied to tire/wheel assembly 11. It will be appreciated therefore that vector V8 is equivalent to vector V6 described earlier with reference to FIG. 2. Based on the displayed magnitude and angle of signal 40b appearing on display 46, an operator at weighting station 50 attaches one or more additional weights, W2, to tire/wheel assembly 11 so as to generate therein the desired limited net static imbalance represented by vector V8. To avoid adding undesired dynamic imbalance, one half of each weight W2 is preferably applied to each opposing side of the flange 11c of assembly 11.

Rather than merely avoiding adding additional undesired dynamic imbalance, a fourth preferred embodiment of the invention, which will now be described with reference to FIGS. 4, 5A and 5B, contemplates generating in a tire/wheel assembly a desired limited net static imbalance of the nature described above while simultaneously nulling any undesired dynamic imbalance which may initially be present therein.

Figure 4:
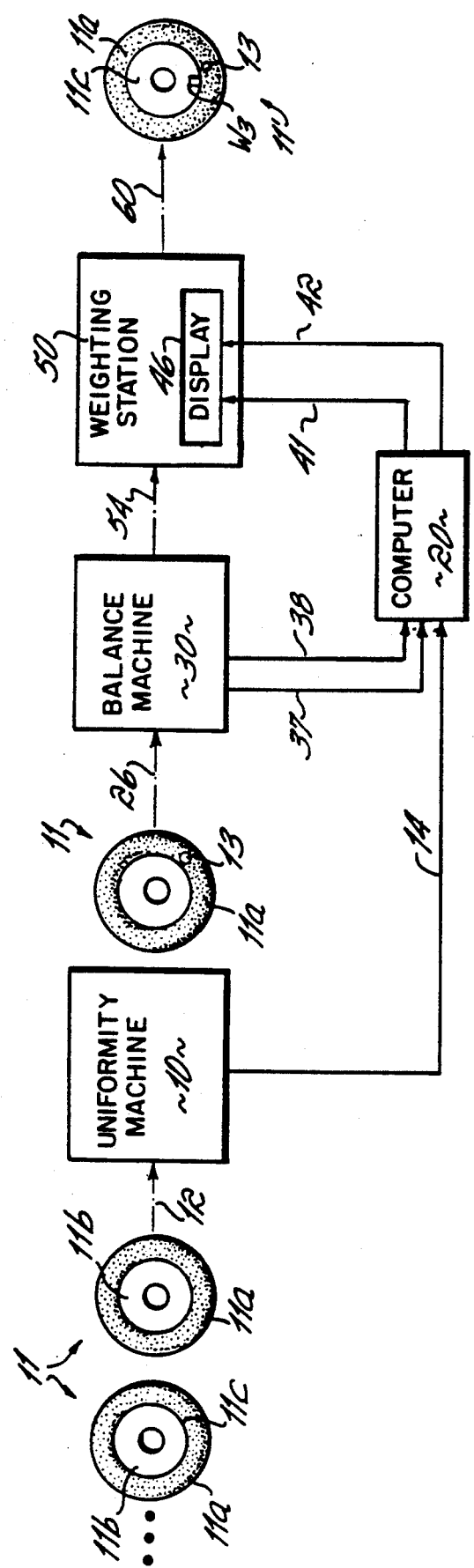
FIG. 4 is a schematic block diagram illustrating a third preferred embodiment of the invention.
Figure 5B:
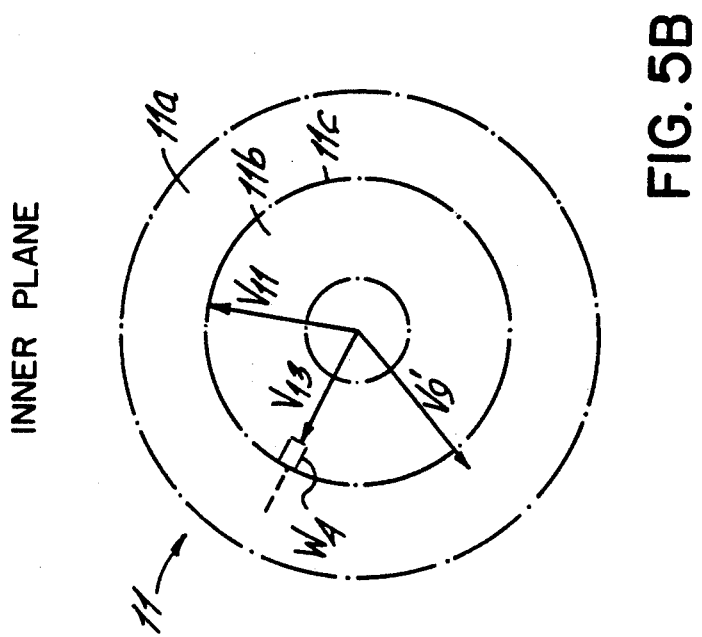
Figure 5A:
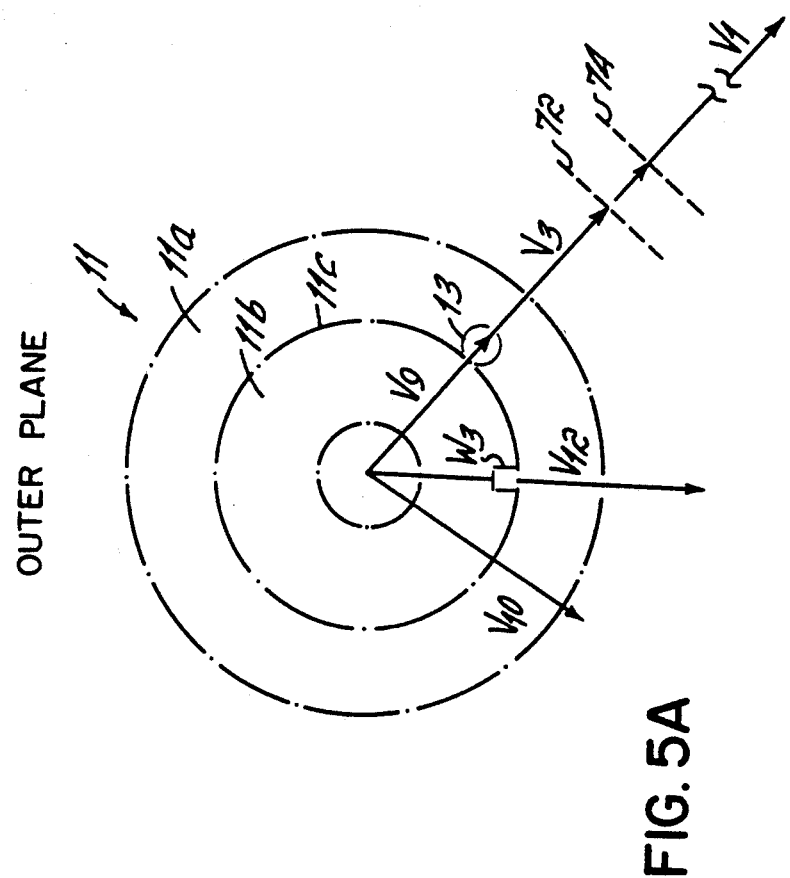

FIG. 4 shows a plurality of tire/wheel assemblies 11 being transported to uniformity machine 10 via conveyor 12. Assemblies 11 are generally characterized as exhibiting dynamic imbalance as well as radial force variation and static imbalance. Uniformity machine 10, operating in the manner described earlier, generates signal 14 which is received by computer 20. Signal 14 represents vector V1 which, as noted earlier, is correlated to a parameter indicative of the radial force variation generated by assembly 11 and preferably represents the magnitude and angle of the first order harmonic of radial force variation measured by machine 10. Machine 10 is again preferably equipped with a marking system which applies a visible mark 13 to the sidewall of each tire 11a in the corresponding angular location as described earlier. Computer 20 uses vector V1 to generate vector V3 in the manner described earlier. From vector V3, a pair of vectors V9 and V9' associated with the outer and inner sides of assembly 11, respectively, are calculated. Both vectors V9 and V9' are at the same angle with respect to mark 13 as vector V3 and each equals exactly half the magnitude of vector V3.

From uniformity machine 10, each tire/wheel assembly 11 is carried via conveyor 26 to a conventional balance machine 30'. Machine 30' may suitably comprise a commercially available balance machine capable of measuring both static and dynamic imbalance simultaneously and is preferably the aforementioned ITW Micropoise Model ATW-231 of equivalent. Upon testing each tire/wheel assembly machine 30' generates and transmits to computer 20 a pair of vector signals 37 and 38. Signals 37 and 38 represent a pair of vectors V10 and V11, respectively, which are correlated to the angles and weights (masses) which, if applied to the outer and inner sides, respectively, of flange 11c would null the static imbalance as well the dynamic imbalance initially present in tire/wheel assembly 11. Computer 20 then adds vectors V9 and V10 in order to determine a vector V12 whose magnitude and angle indicate the angle and weight (mass) of a weight W3 to be added to the outer side of flange 11c. Computer 20 generates a signal 41 correlated to vector V12 and transmits same to a display 46 located at weighting station 50 for displaying thereon in any of the formats described earlier. Likewise, computer generates and transmits to display 46 a signal 42 representing a vector V13 defined as the sum of vectors V9' and V11. Vector V13 represents the magnitude and angle of a weight W4 to be applied to the inner side of tire/wheel assembly 11.

In accordance with the weight and angle information appearing on display 46, an operator at weighting station 50 selects weights W3 and W4 of appropriate weight (mass) and applies them to the outer and inner sides of flange 11c at the respective angles indicated on display 46 in order to produce in tire/wheel assembly 11 a desired limited net static imbalance.

When a completed tire/wheel assembly 11' rotates during use on a vehicle, the desired limited static imbalance produced according to any of the above embodiments generates a force of speed-dependent magnitude which opposes and tends to cancel the radial force variation component represented by vector V1. As a consequence, vehicle vibration in both the vertical and fore/aft directions is reduced over a wide range of speeds. The degree of cancellation of vector V1 and the concomitant reduction in vibration increases with speed until a speed at least as great as the aforementioned designated highway speed is reached. At that speed, nearly perfect cancellation is achieved so that vibration due to radial force variation and static imbalance in reduced to a minimum.

While the apparatai, methods and tire/wheel assemblies described herein constitute preferred embodiments of the invention, it is to be understood that the invention is not limited to the particular forms described since, in light of the present disclosure, those skilled in the art will readily recognize changes which can be made thereto without departing from the scope of the invention as particularly pointed out and distinctly claimed in the appended claims including all legal equivalents.

What is claimed is:

1. Method for reducing the tendency of a tire/wheel assembly to cause vibration in a plane perpendicular to its axis of rotation, said assembly initially being characterized by a first vector correlated to radial force variation and a second vector correlated to static imbalance, said method comprising the step of:
    altering the mass of the assembly so as to produce therein an additional static imbalance which, when vectorially combined with said second vector, results in a limited net static imbalance oriented substantially opposing said first vector, said limited net static imbalance having a magnitude selected not to exceed a predetermined maximum limit.

2. The method of claim 1 further comprising the step of selecting said magnitude of said limited net static imbalance as being substantially equal to the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

3. The method of claim 2 wherein said designated speed corresponds to a speed lying within a range of highway speeds expected to be encountered by said tire/wheel assembly when it is in use.

4. The method of claim 3 wherein said range of highway speeds extends from about 50 miles per hour to about 70 miles per hour.

5. The method of claim 3 wherein said designated speed is about 60 miles per hour.

6. The method of claim 2 wherein said predetermined maximum limit corresponds to a static imbalance of a magnitude sufficient to give rise to a centrifugal force of no more than about four pounds when said tire/wheel assembly rotates at a speed as least as great as said designated speed.

7. The method of claim 2 wherein said first vector is correlated to the first order harmonic of said radial force variation.

8. A tire/wheel assembly produced according to a process comprising the steps of:
    mounting a tire upon an wheel to form an assembly;
    determining a first vector correlated to radial force variation of said assembly;
    determining a second vector correlated to the static imbalance initially inherent in said assembly; and
    altering the mass of said assembly so as to produce therein an additional imbalance which, when vectorially combined with said second vector, results in a limited net static imbalance oriented substantially opposite said first vector, the magnitude of said limited net static imbalance being selected to substantially equal the lesser of:
    (i) a predetermined maximum limit, and
    (ii) the magnitude of static imbalance required to generate a centrifugal force whose magnitude substantially equals that of said first vector when said tire/wheel assembly rotates at a designated speed.

9. The tire/wheel assembly of claim 8 wherein the step of determining said first vector comprises the step of testing said assembly on a uniformity machine.

10. The tire/wheel assembly of claim 8 wherein the step of determining said first vector comprises the steps of:
    measuring a dimensional parameter of the wheel;
    measuring a radial force variation parameter of the tire; and
    determining said first vector as a function of said radial force variation parameter, said dimensional parameter and a constant representing a spring rate of said tire.

11. The tire/wheel assembly of claim 8 wherein said designated speed corresponds to a speed lying within a range of highway speeds expected to be encountered by said tire/wheel assembly when it is in use.

12. The tire/wheel assembly of claim 11 wherein said range of highway speeds extends from about 50 miles per hour to about 70 miles per hour.

13. The tire/wheel assembly of claim 11 wherein said designated speed is about 60 miles per hour.

14. The tire/wheel assembly of claim 8 wherein said predetermined maximum limit corresponds to a static imbalance of a magnitude sufficient to give rise to a centrifugal force of no more than about four pounds when said tire/wheel assembly rotates at a speed as least as great as said designated speed.

15. A tire/wheel assembly exhibiting reduced vibration in a plane perpendicular to its rotational axis, said assembly having a radial force variation parameter described by a first vector, said assembly comprising:
    a wheel rotatably about said axis;
    a tire mounted upon said wheel; and
    at least one weigh mounted to at least one of said tire and said wheel, said weight being of such mass and so oriented as to produce in said assembly a limited net static imbalance oriented substantially opposing said first vector, said limited net static imbalance having a magnitude selected not to exceed a predetermined maximum limit.

16. The tire/wheel assembly of claim 15 wherein the magnitude of said limited net static imbalance is selected to substantially equal the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

17. The tire/wheel assembly of claim 15 wherein said parameter comprises the first order harmonic of said radial force variation.

18. The tire/wheel assembly of claim 16 wherein said designated speed corresponds to a speed in the range of about 50 miles per hour to about 70 miles per hour and wherein said predetermined maximum limit corresponds to a static imbalance of a magnitude sufficient to give rise to a centrifugal force of no more than about four pounds when said assembly rotates at a speed as least as great as said designated speed.

19. A method for reducing the tendency of a tire/wheel assembly to cause vibration in a plane perpendicular to its axis of rotation, said method comprising the steps of:
    determining a first vector correlated to at least one selected harmonic of radial force variation of said assembly;
    determining a second vector correlated to the static imbalance initially present in said assembly;
    determining a third vector from said first and second vectors, said third vector being correlated to an additional imbalance which, when combined with said static imbalance initially present in said assembly, produces a net static imbalance oriented opposed to said first vector so as to generate a centrifugal force tending to cancel said first vector when said tire/wheel assembly rotates in use, and
    limiting the magnitude of said net static imbalance so as not to exceed a predetermined maximum limit.

20. The method of claim 19 wherein said limiting step comprises the step of selecting the magnitude of said net static imbalance as being substantially equal to the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

21. A method for reducing the tendency of a tire/wheel assembly to cause vibration in a plane perpendicular to its axis of rotation, said method comprising the steps of:
    determining a first vector correlated to a parameter describing radial force variation of the assembly;
    balancing the assembly so as to substantially null at least any static imbalance initially present therein; and
    altering the mass of the assembly imbalance oriented substantially opposing said first vector, said limited net static imbalance having a magnitude selected not to exceed a predetermined maximum limit.

22. The method of claim 21 further comprising the step of selecting the magnitude of said net static imbalance as being substantially equal to the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

23. A tire/wheel assembly produced according to the process of:
    mounting a tire upon a wheel to form an assembly;
    determining a first vector correlated to a parameter describing radial force variation of the assembly;
    balancing the assembly so as to substantially null at least any static imbalance initially present therein; and
    altering the mass of the assembly so as to produce therein a limited net static imbalance oriented substantially opposing said first vector, said limited net static imbalance having a magnitude selected not to exceed a predetermined maximum limit.

24. The tire/wheel assembly of claim 23 wherein the magnitude of said limited net static imbalance is selected as being substantially equal to the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

25. An apparatus for determining an additional static imbalance to be applied to a tire/wheel assembly so as to produce therein a limited net static imbalance which reduces the tendency of the assembly to cause vibration in the plane perpendicular to its axis of rotation when it is in use, said apparatus comprising:
    a first machine for generating a first signal representing a first vector, said first vector being correlated to at least one selected harmonic of racial force variation of the assembly;
    a second machine for generating a second signal representing a second vector, said second vector being correlated to an initial static imbalance of the assembly; and
    a computer operably coupled to said first and second machines for receiving said first and second signals respectively therefrom and for generating based on said first and second signals, a third signal correlated to said additional imbalance to be applied to said assembly so as to produce said limited net static imbalance therein, such that said limited net static imbalance is oriented substantially opposing said first vector and such that said net static imbalance has a magnitude not in excess of a predetermined maximum limit.

26. The apparatus of claim 25 wherein said computer operates to set the magnitude of said limited net static imbalance substantially equal to the lesser of:
    (i) said predetermined maximum limit, and
    (i) the magnitude of static imbalance required to generate a centrifugal force whose magnitude substantially equals that of said first vector when said tire/wheel assembly rotates at a designated speed.

27. The apparatus of claim 25 wherein said first machine comprises a uniformity machine and said selected harmonic comprises the first order harmonic.

28. The apparatus of claim 25 further comprising display means operably coupled to said computer for displaying the magnitude and angle of said third signal in humanly readable form.

29. A method of reducing the tendency of a tire/wheel assembly to cause vibration when in use, said method comprising the steps of:
    altering the mass of said assembly so as to produce therein a limited net static imbalance oriented in a direction substantially opposing
    a vector representing at least one harmonic component of radial force variation of the assembly, said limited net static imbalance having a magnitude selected not to exceed a predetermined maximum limit.

30. The method of claim 29 further comprising the step of selecting said magnitude of said limited net static imbalance as being substantially equal to the lesser of:
    (i) said predetermined maximum limit, and (ii) the magnitude of static imbalance required to generate a centrifugal force whose magnitude, when the tire/wheel assembly rotates at a designated speed, substantially equals the magnitude of at least one harmonic component of radial force variation of the tire/wheel assembly.

31. The method of claim 30 wherein said predetermined maximum limit corresponds to a static imbalance of a magnitude sufficient to give rise to a centrifugal force of no more than about four pounds when said tire/wheel assembly rotates at a said designated speed within the range of about fifty miles per hour to about seventy miles per hour.

32. A tire/wheel assembly produced according to a process comprising the steps of:
    mounting a tire upon a wheel to form an assembly, and
    altering the mass of said assembly so as to produce therein a limited net static imbalance oriented in a direction substantially opposing
    a vector representing at least one harmonic component of radical force variation of the assembly, said limited net static imbalance having a magnitude selected not to exceed a predetermined maximum limit.

33. The tire wheel assembly of claim 32 wherein said process comprises the step of selecting said magnitude of said limited net static imbalance as being substantially equal to the lesser of:
    (i) said predetermined maximum limit, and
    (ii) the magnitude of static imbalance required to generate a centrifugal force whose magnitude, when the tire/wheel assembly rotates at a designated speed, substantially equals the magnitude of at least one harmonic component of radial force variation of the tire/wheel assembly.

34. The method of claim 32 wherein said predetermined maximum limit corresponds to a static imbalance of a magnitude sufficient to give rise to a centrifugal force of no more than about four pounds when said tire/wheel assembly rotates at a said designated speed within the range of about fifty miles per hour to about seventy miles per hour.

35. An apparatus for determining an additional static imbalance to be applied to a tire/wheel assembly so as to produce therein a limited net static imbalance which reduces the tendency of the assembly to cause vibration in the plane perpendicular to its axis of rotation when it is in use, said apparatus comprising:
    means for generating a first signal representing a first vector correlated to at least one harmonic of radial force variation of the assembly and for generating a second signal representing a second vector correlated to an initial static imbalance of the assembly, and
    means coupled to the aforesaid means for receiving said first and second signals therefrom and for generating, based on said first and second signals, a third signal correlated to said additional static imbalance to be applied to said assembly so as to produce said limited net static imbalance therein such that said limited net static imbalance is oriented substantially opposing said first vector and such that said net static imbalance has a magnitude not in excess of a predetermined maximum limit.

36. The apparatus of claim 35 further comprising means for limiting the magnitude of said limited net static imbalance to the lesser of:
    (i) said predetermined maximum limit, and
    (ii) the magnitude of static imbalance required to generate a centrifugal force whose magnitude substantially equals that of said first vector when said tire/wheel assembly rotates at a designated speed.

* * * * *